(No Model.)

A. R. ISAACS.
COOKING UTENSIL.

No. 476,746. Patented June 7, 1892.

WITNESSES:
J. A. Bergstrom
C. Sedgwick

INVENTOR:
A. R. Isaacs
BY Munn & Co
ATTORNEYS

UNITED STATES PATENT OFFICE.

AUGUSTA R. ISAACS, OF NEW YORK, N. Y.

COOKING UTENSIL.

SPECIFICATION forming part of Letters Patent No. 476,746, dated June 7, 1892.

Application filed November 11, 1891. Serial No. 411,585. (No model.)

*To all whom it may concern:*

Be it known that I, AUGUSTA R. ISAACS, of New York city, in the county and State of New York, have invented a new and useful Improvement in Cooking Utensils, of which the following is a full, clear, and exact description.

My invention relates to an improvement in cooking utensils, and has for its object to provide a utensil capable of being inserted in a pot of water and the contents of the vessel be steamed or boiled without escaping therefrom.

A further object of the invention is to so construct the utensil that the material located therein when cooked may be delivered to a platter in bulk and without injury.

A further object of the invention is to provide the utensil with a receptacle removable therefrom, in which receptacle a sauce, for instance, may be cooked designed for use in connection and also simultaneously with the material located in the body of the utensil.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
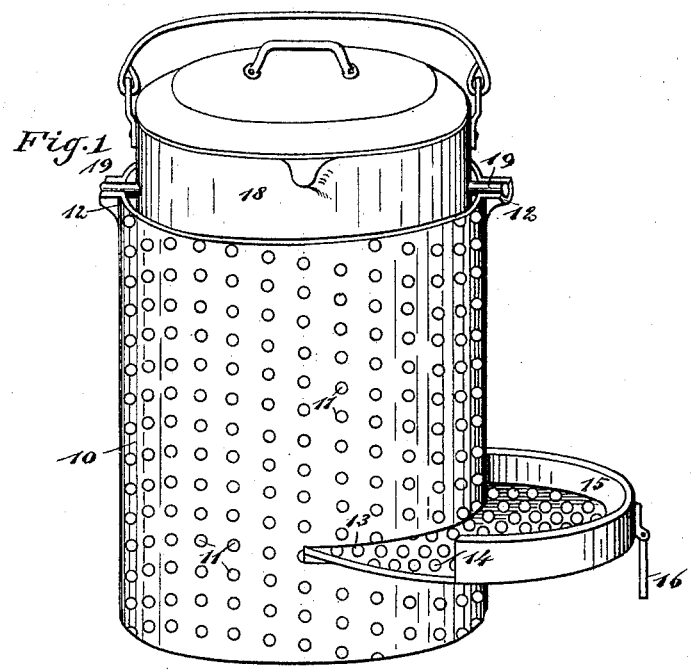
Figure 2:
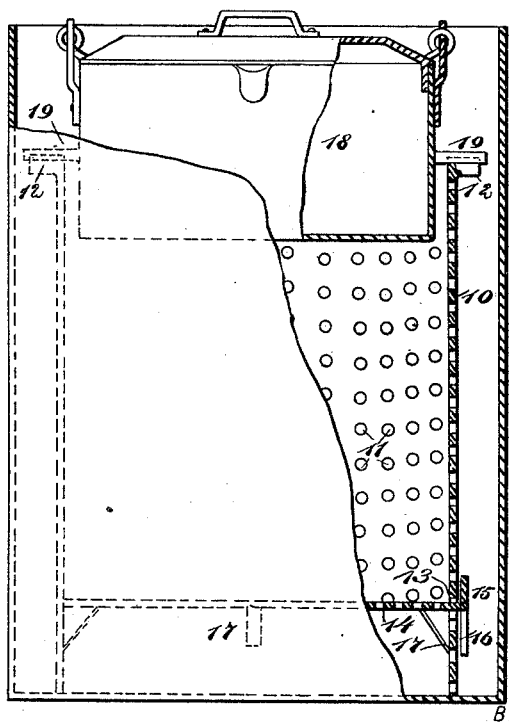

Figure 1 is perspective view of the utensil; and Fig. 2 is a partial central vertical section through the body of the utensil, representing the same as in a pot, the said pot being likewise in section.

The body 10 of the device is preferably made of sheet-iron or of sheet metal and is hollow and open at the top and bottom. The said body may be of any shape in cross-section—as, for instance, oblong or circular—and the metal of which the body is constructed is perforated, the perforations 11 being located at suitable intervals apart. At opposite sides of the body, at its upper edge, sockets 12 are located, the said sockets being preferably horizontal and semicircularly-shaped in cross-section.

Near the bottom of the body in one side an opening 13 is formed, the said opening being adapted to receive a perforated plate 14, which plate at its front edge has produced thereon an upwardly-extending flange 15, and the flanged portion of the plate is provided with a handle 16, the said handle having a hinge connection with the plate, whereby it may be carried from a horizontal to a vertical position, or vice versa. When the plate has been introduced into the opening 13 in the body, it rests upon brackets 17, secured to the inner face of said body, as shown in Fig. 2, and when the plate is so located it constitutes a removable bottom for the body of the utensil, and its flange 15 closes the opening 13 or forms a shield for the opening.

A saucepan 18 is located in the top of the body 10. The saucepan extends some little distance down within the body and is provided with trunnions 19, the said trunnions resting upon the body-sockets 12.

In the operation of the device the perforated plate 14 is introduced into the body, and the material to be cooked—as fish or asparagus, for instance—is placed in the body, resting upon the bottom formed by the plate. Any desired material—as, for instance, sauce—may be placed in the saucepan 18, and the saucepan is seated in the bearings of the body, as shown in the drawings. After the plate 14 is introduced into the body the handle 16 is carried downward, as shown in Fig. 2. The entire device is now placed in a suitable pot 20, containing a proper quantity of water, and according to the quantity of water in the pot will the material contained in the body of the utensil be steamed or boiled, and whatever the material that may be contained in the saucepan it will under all circumstances be steamed. After the material contained in the utensil has been properly cooked the utensil is removed from the pot 20 and is placed upon a platter or other dish adapted to receive its contents, and by drawing out the sliding plate 14 from the body of the utensil the contents of the latter will fall down *en masse* upon the platter. Thus if fish or asparagus or a like material has been prepared and cooked the said material will not be broken when placed upon the platter, and the necessity of removing such articles as asparagus piece by piece is avoided.

Either before or after the body of the utensil is removed from the platter if sauce is in the saucepan 18 said sauce may be poured over the material which has been cooked in the body of the utensil. The saucepan may be provided with a suitable handle for removing it from the body of the utensil, or a bail may be substituted for the handle, as shown in the drawings.

It is obvious that this device is exceedingly simple, economic, and effective, and that it will prevent material cooked therein from becoming injured or broken while serving up, and, further, that material of different kinds may be cooked at one time in the same vessel.

The saucepan may snugly fit in the top of the body of the receptacle, and thereby constitute a cover therefor, or the saucepan may be more or less loosely fitted to the body.

Having thus described my invention, I claim as new and desire to secure by Letters Patent—

1. A cooking utensil comprising a perforated body having an open top and bottom and provided with an opening in one side near the bottom and with brackets on the inside in the plane of the opening, and a perforated plate fitted to slide in the opening and resting upon the said brackets, substantially as described.

2. A cooking utensil comprising a perforated body having an open top and bottom and provided with an opening in one side and with brackets on the inside in the plane of the opening and a perforated plate fitting in the opening and provided with an upwardly-projecting flange fitting against the side of the body and closing the opening thereof, substantially as described.

3. A cooking utensil consisting of a perforated body open at top and bottom and provided with an opening in one side and with brackets on the inside in the plane of the opening, a perforated plate fitted to slide in the opening and resting upon the brackets, and a saucepan fitting in the top of the body and forming a cover therefor, substantially as described.

4. The herein-described cooking utensil, consisting of a perforated body open at top and bottom and provided with bearings at the top and opening in one side and brackets on the inside in the plane of the opening, a perforated plate fitted to slide in the opening and resting upon the brackets and provided with a flange closing said opening, and a saucepan fitting in the top of the body and provided with trunnions resting in the said bearings, as specified.

AUGUSTA R. ISAACS.

Witnesses:
J. FRED ACKER,
C. SEDGWICK.